United States Patent
Gabor et al.

(10) Patent No.: US 7,831,247 B2
(45) Date of Patent: Nov. 9, 2010

(54) METHOD OF COMMUNICATION AND COMMUNICATION SYSTEM

(75) Inventors: Jaro Gabor, Budapest (HU); Gabor Bajko, Budapest (HU); Marco Stura, Espoo (FI)

(73) Assignee: Nokia Corporation, Espoo (FI)

( * ) Notice: Subject to any disclaimer, the term of this patent is extended or adjusted under 35 U.S.C. 154(b) by 248 days.

(21) Appl. No.: 10/291,760

(22) Filed: Nov. 12, 2002

(65) Prior Publication Data
US 2004/0203710 A1 Oct. 14, 2004

(51) Int. Cl.
*H04W 4/00* (2009.01)
(52) U.S. Cl. ............... 455/422.1; 455/405; 455/406; 455/408; 379/13; 379/100.04; 379/114.01; 379/121.02
(58) Field of Classification Search ........... 455/405, 455/406, 408, 422, 422.1; 379/13, 100.04, 379/114.01, 121.02
See application file for complete search history.

(56) References Cited

U.S. PATENT DOCUMENTS

| | | | | |
|---|---|---|---|---|
| 3,662,125 | A * | 5/1972 | Haas, Jr. ................... | 379/24 |
| 3,809,818 | A * | 5/1974 | Johnston ................... | 370/216 |
| 4,472,600 | A * | 9/1984 | Kaminsky ................. | 379/116 |
| 4,924,457 | A * | 5/1990 | Shimizu .................... | 370/346 |
| 6,275,700 | B1 * | 8/2001 | Takahashi ................ | 455/434 |
| 6,567,657 | B1 * | 5/2003 | Holly et al. .............. | 455/408 |
| 6,687,357 | B1 * | 2/2004 | Sakaue et al. ............ | 379/202.01 |
| 2003/0128826 | A1 * | 7/2003 | Benini et al. ............ | 379/114.01 |

OTHER PUBLICATIONS

KR2001002929A: Jung, S G, (Jan. 15, 2001) Method for supplying charging system of asynchronous data call while wireless data call is serviced.*

ETSI: "3rd Generation Partnership Project; Technical Specification Group Service and System Aspects; Telecommunication management; Charging management; Charging data description for the IP Multimedia Subsystem (IMS) (Release 5)", Sep. 2002, XP002273902, URL:ftp://ftp.3gpp.org/specs/archive/32_series/32.225/>, pp. 25, 40 and 55.

ETSI: "3rd Generation Partnership Project; Technical Specification Group Services and System Aspects; Telecommunication management; Charging management; Charging principles (Release5)", Jun. 2002, XP002273903, URL:ftp://ftp.3gpp.org/specs/archive/32_series/32.200/>, pp. 24 and 28.

3GPP TS 23.228 v5.6.0, 3rd Generation Partnership Project; Technical Specification Group Services and System Aspects; IP Multimedia Subsystem (IMS); Stage 2 (Release 5), Sep. 2002.

Rosenberg et al., "SIP: Session Initiation Protocol", Network Working Group, RFC 3261, Jun. 2002.

* cited by examiner

*Primary Examiner*—Nghi H Ly
(74) *Attorney, Agent, or Firm*—Mintz, Levin, Cohn, Ferris, Glovsky and Popeo, P.C.

(57) ABSTRACT

This invention relates to a method of communication comprising attempting to set up a session between a calling party and a called party via at least one entity; after a confirming response has been received from at least one of said called party, said calling party and said at least one entity, determining if said attempt to set up a session has failed; and preventing at least one of said calling party and said called party from being charged for said session.

36 Claims, 3 Drawing Sheets

METHOD OF COMMUNICATION AND COMMUNICATION SYSTEM

FIELD OF THE INVENTION

The present invention relates to a method of communication and in particular but not exclusively to a method of communication in an IP multimedia network using SIP messages. The present invention also relates to a communication system.

BACKGROUND OF THE INVENTION

A communication system is a facility that enables communication between two or more entities such as user equipment and/or other nodes associated with the system. The communication may comprise, for example, communication of voice, data, multimedia and so on.

Communication systems proving wireless communication for user terminals or other nodes are known. An example of a wireless system is a public land mobile network (PLMN). A PLMN is typically a cellular system wherein a base transceiver station (BTS) or similar access entity serves user equipment (UE) such as mobile stations (MS) via a wireless interface between these entities. The operation of the apparatus required for the communication can be controlled by one or several control entities. The various control entities may be interconnected. One or more gateway nodes may also be provided for connecting the cellular network to other networks, such as to another cellular system or to a public switched telephone network (PSTN) and/or other communication networks such as an IP (Internet Protocol) and/or other packet switched data networks. The communication between the user equipment and the elements of the communication network can be based on an appropriate communication protocol, such as the session initiation protocol (SIP).

A communication system typically operates in accordance with a given standard or specification which sets out what the various elements of the system are permitted to do and how that should be achieved. For example, the standard or specification may define if the user, or more precisely, user equipment or terminal is provided with a circuit switched service and/or a packet switched service. Communication protocols and/or parameters which shall be used for the connection may also be defined. In other words, a specific set of "rules" on which the communication can be based needs to be defined to enable communication by means of the system.

The communication systems typically have separated functions. In addition to provisioning of services for the users of the system the communication system also provides functions such as network management and configuration. In the current third generation (3G) multimedia network architectures various servers are used for handling of provision of different communication services for mobile users. An example of one of the services is the so-called IP multimedia services (IMS), defined in $3^{rd}$ Generation partnership project 3GPP specifications. Among other functions, these servers provide call state control functions (CSCFs). A call state control function entity may provide functions such as serving call state control (S-CSCF), proxy call state control (P-CSCF), and interrogating call state control (I-CSCF). Control functions may also be provided by entities such as a home subscriber server (HSS) and various application servers. The HSS is typically for storing permanently the user's (subscriber's) profile.

In order to be able to request for a service from a communication system a user needs to be registered in the system in a serving control entity such as the S-CSCF. A user may register via an access entity of the communication system. In addition to the serving control entity, the user may need to be associated with a proxy control entity, such as the P-CSCF. The proxy entity is assigned to an area within which the user has roamed. For a more general case, when a user accesses the network through an arbitrary type of access network it can be assumed that the access network assigns a proxy control entity for controlling the accessed services from that network point of view, e.g. for bandwidth management.

It shall be appreciated that the term "session" used in this document refers to any communication a user may have such as to a call, data (e.g. web browsing) or multimedia communication and so on.

In IMN (IM network) using SIP, charging is started when the 200 OK message is processed by the S-CSCF for the called party. However this has the following problem. The 200 OK message may not be received by the caller. This may for example be because the next hop CSCF fails, the user equipment of the calling party goes out of coverage, etc. In such cases the session set-up fails and it should not be charged. However, the current standardization proposals have not recognized this as a problem and in fact with the current proposals a caller could be charged for a session, which is unsuccessful.

In more detail, the current standardization proposals define the charging records as being created (that is charging is caused) when the 200 OK message is processed by the S-CSCF of the called party. In cases where the session set-up fails, there is no mechanism for canceling the charging information.

It shall be appreciated that although the above discussed problems relate to IMS in third generation (3G) communication systems, similar disadvantages may be associated with other systems as well and thus the description is not limited to these examples.

SUMMARY OF INVENTION

It is an aim of embodiments of the present invention to address one or more of the problems discussed above.

According to a first aspect of the present invention there is provided a method of communication comprising attempting to set up a session between a calling party and a called party via at least one entity; after a confirming response has been received from at least one of said called party, said calling party and said at least one entity, determining if said attempt to set up a session has failed; and preventing at least one of said calling party and said called party from being charged for said session.

According to a second aspect of the present invention there is provided a communications system comprising a calling party; a party to be called; and at least one entity between said calling party and said called party, said at least one entity being responsible for charging and arranged to prevent at least one of the calling party and the called party from being charged for said session if an attempt to set up a session between the calling party and the called party has failed after a confirming response has been received.

According to a third aspect of the present invention there is provided an entity for use in a communications system comprising a calling party and a called party, said entity being arranged between said called and calling parties, said entity being arranged to prevent at least one of the calling party and the called party from being charged for said session if an attempt to set up a session between the calling party and the called party has failed after a confirming response has been received.

According to a fourth aspect of the present invention there is provided an entity for use in a communications system comprising a calling party and a called party, said entity being arranged between said called and calling parties, said entity being responsible for charging and arranged to prevent at least one of the calling party and the called party from being charged for said session if an attempt to set up a session between the calling party and the called party has failed after a confirming response has been received.

Embodiments of the invention are arranged to detect session failure cases occurring after the 200 OK message is processed at the S-CSCF, in IMS systems using SIP. Embodiments of the invention are arranged to ensure that action is taken with regard to charging information if it is determined that a session failure has occurred after the 200 OK message has been processed at the S-CSCF. In preferred embodiments of the present invention, when session set-up fails after the 200 OK message is processed, the initiator of the session is not be charged.

BRIEF DESCRIPTION OF FIGURES

For a better understanding of the present invention and as how the same may be carried into effect, reference will now be made by way of example only to the accompanying drawings in which.

DETAILED DESCRIPTION OF PREFERRED EMBODIMENTS OF THE INVENTION

The 3G Partnership Project (3GPP) is defining a reference architecture for the Universal Mobile Telecommunication System (UMTS) core network which will provide the users of user equipment UE with access to these services. This UMTS core network is divided into three principal domains. These are the Circuit Switched domain, the Packet Switched domain and the Internet Protocol Multimedia (IM) domain. The latter of these, the IM domain, makes sure that multimedia services are adequately managed. The IM domain supports the Session Initiation Protocol (SIP) as developed by the Internet Engineering Task Force (IETF).

In the current third generation (3G) multimedia network architectures it is assumed that various servers are used for handling different functions associated with a session. The 3G systems Internet Protocol (IP) multimedia subsystems (IMSs) have been developed with an attempt to conform to Internet standards set out be the IETF (Internet Engineering Task Force) in order to achieve access independence and to maintain a smooth interoperation with wireless terminals across the Internet. Therefore, interfaces specified conform as far as possible to IETF standards for those cases where an IETF protocol, e.g. the Session Initiation Protocol (SIP), has been selected.

The IMN enables operators of mobile networks to offer their subscribers multimedia services based on and built upon Internet applications, services, and protocols. The embodiments of the present invention will be described in the context of the Universal Mobile Telecommunication System (UMTS) 3G system and session initiation protocol (SIP).

Those interested may gather a more detailed description of the IMN from the 3GPP ($3^{rd}$ Generation Partnership Project) specification TS 23.228.

Figure 1:
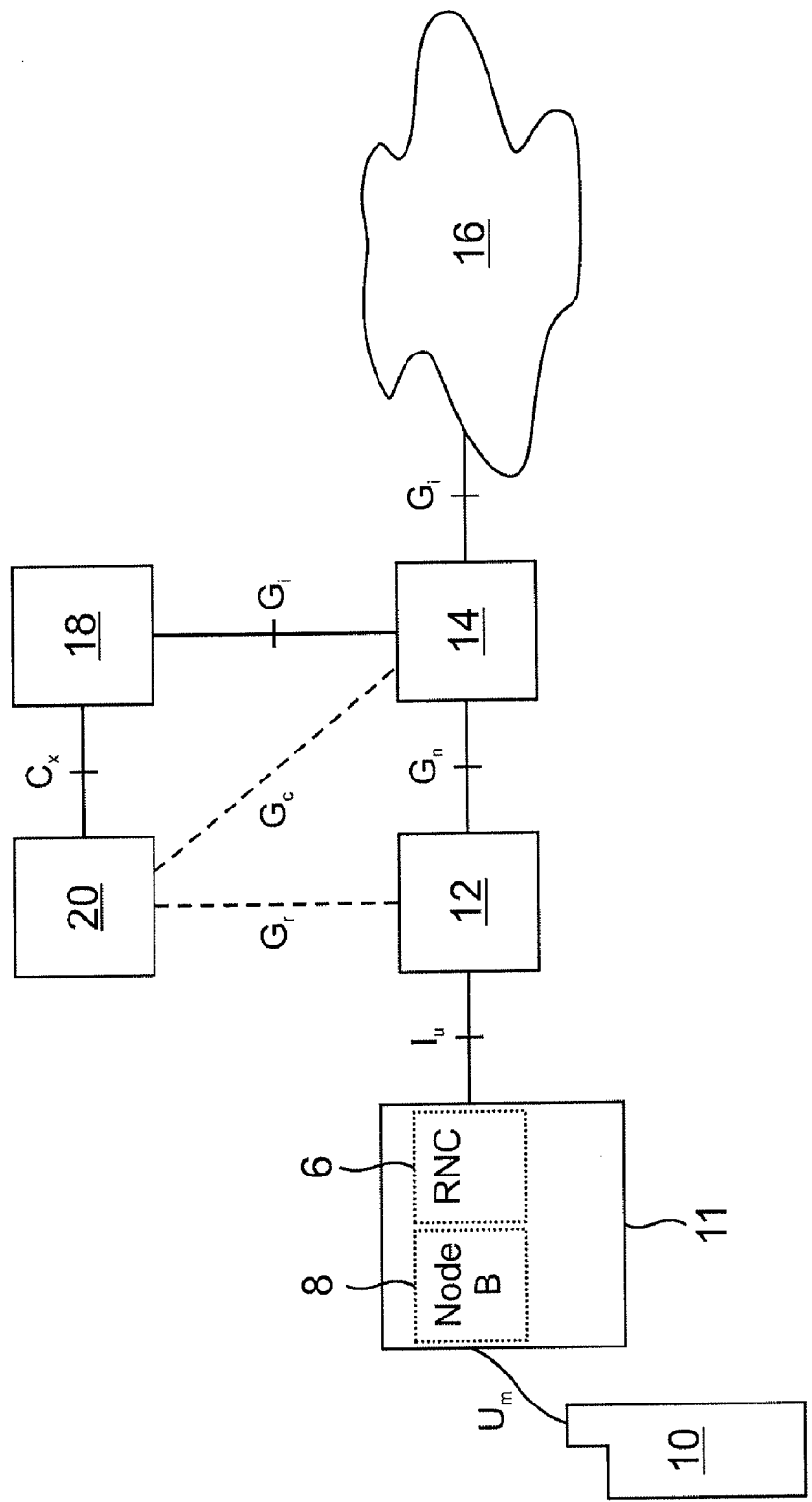
FIG. 1 shows a system in which embodiments of the present invention can be implemented.

FIG. 1 illustrates a partial internet protocol (IP) multimedia network architecture. A mobile station (MS) 10 can be a mobile telephone or a laptop computer which has a radio modem or a fax adapted for radio access. The term MS is used here as an example of mobile user equipment (UE). This communicates with the Universal Mobile Telecommunication System (UMTS) Radio Access Network (UTRAN) 11 over the radio interface ($U_m$). The UTRAN includes a network element node B 8, which provides equipment for transmission and reception of messages and may additionally include ciphering equipment. This communicates with a radio network controller (RNC) 6 as is known in the art.

The RNC sets up the radio channels for signaling to the core network node 12 which may comprise a serving General Packet Radio Service GPRS support node (SGSN). The signaling occurs over the $I_u$ interface. The SGSN provides the network access node and mobility management functions. The node 12 is a switching node which can perform connection management, mobility management and authentication activities. The core network node 12 is connected to the gateway GPRS support node (GGSN) 14 via the $G_n$ interface. The GGSN provides access, via the $G_i$ interface, to the services area 16 over IP packet data networks such as the Internet and Internet service providers (ISP).

The call state control function (CSCF) 18 supports and controls sessions during which the UE obtains IMS services from the services area 16. In addition, CSCF may consist of Proxy, Interrogating and Serving CSCFs as described earlier. The CSCF provides flexibility to modify, add or erase bearers used by the user's services. Amongst other functions the CSCF 18 controls call functions, thus executes call setup, modification and termination and performs address handling. The CSCF accesses the Home Subscriber Server (HSS) 20 via the $C_x$ interface. The HSS is a master server containing data relating to a particular user. It contains data relating to a specific user, which can identify how call services are to be carried out and authentication and authorization information. The HSS is located in the home network of the UE user which may be some distance from the location of the UE, which is serviced by a local (visited) network. The HSS is connected to the SGSN and GGSN via the $G_r$ and $G_c$ interfaces respectively.

In order to provide access to the Internet and other IM services to users, protocols have been developed to assist in providing telephony services across the Internet. The session initiation protocol (SIP) is one such protocol, which has been developed for controlling the creation, modification and termination of sessions with one or more parties. The call sessions may include Internet or other IP network telephone calls, conferences or other multimedia activities.

SIP is an application layer signaling protocol for starting, changing and ending user sessions. A session may, for example, be a two-way telephone call or multi-way conference session. The establishment of these sessions enables a user to be provided with the services above mentioned. One of the basic features of SIP is that the protocol enables personal mobility of a user using mobile UE by providing the capability to reach a called party via a single location independent address.

SIP addressing follows the popular Internet convention of identifying a user by a unique address using Uniform Resource Locators (URL's). SIP signaling between two users consists of a series of requests and responses. A SIP transaction has dual parties, the user agent client (UAC) who sends a request and a user agent server (UAS) who responds in reply to the request. The client and server comprise the SIP user agent. In addition to this, SIP includes the SIP network server which is the network device/s which handle signaling associated with multiple calls.

As is known in the art an SIP invitation typically includes two messages. It will be understood that there may be more messages than only these and that, in fact, in 3GPP there are more messages used. These are not discussed herein for the sake of brevity. The two messages are an INVITE, initiated by the caller and a 200 OK message from the called party. This latter message is typically acknowledged by the caller after which stage the parties may communicate according to parameters sent and received during signaling. Both caller and called party can end a session by executing a BYE message. During an established session a new set of parameters may be selected by either participant producing a further INVITE message or by using some other SIP message.

SIP also provides for registration which enables a user to be reached/contacted. SIP clients register themselves with the communication system using a REGISTER message, which requests are directed to SIP servers termed Registrars in the SIP network.

The SIP Network includes proxies and other server nodes which may be included in other elements of the communication system or may comprise separate elements.

In the following description, SIP messages are written in capitals.

Figure 2:
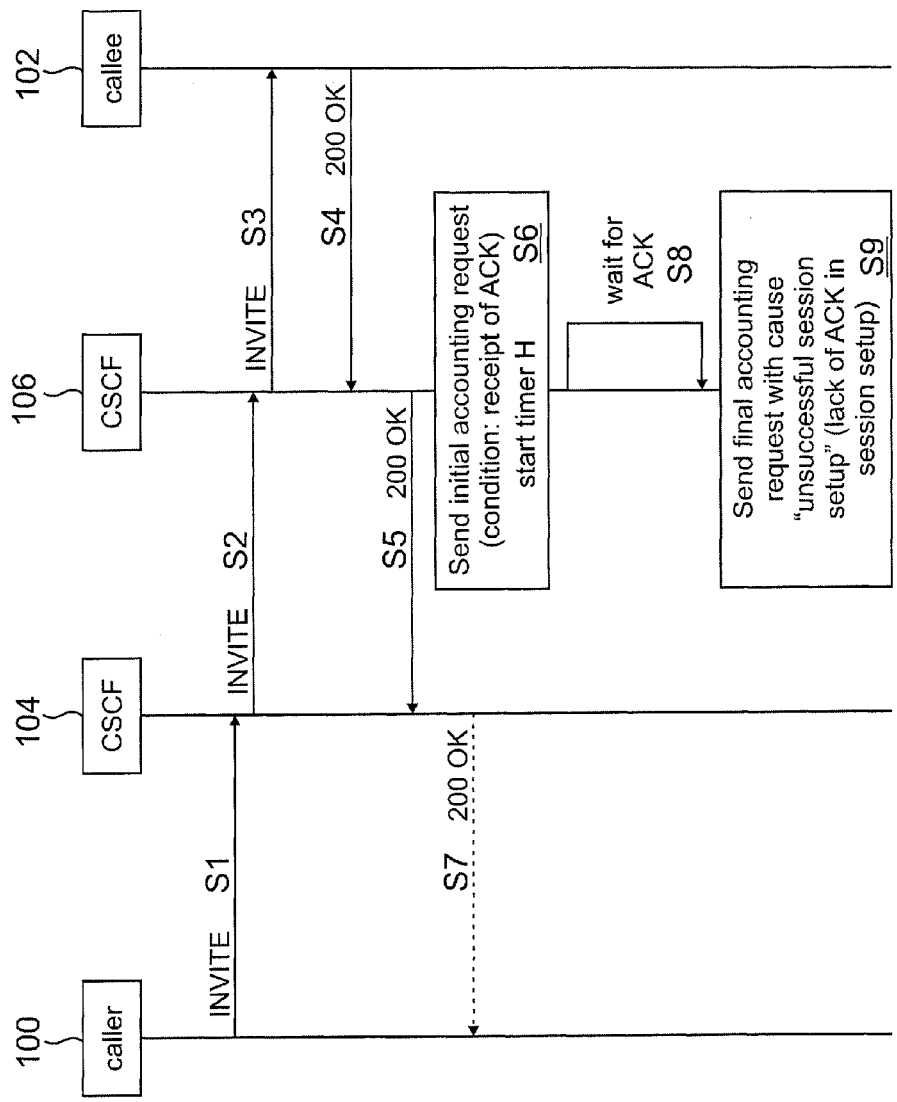
FIG. 2 shows a first signaling scenario between a calling party and a party being called.

Reference is made to FIG. 2 which shows a first signaling scenario between a caller 100 and the party being called 102. In FIG. 2, the calling party, the called party and two CSCF entities are shown. In practice, there may be other entities between the called party and the calling party but these are omitted for clarity.

In step S1, the caller 100 sends an INVITE message to a first CSCF 104. The first CSCF 104 sends the INVITE message to a second CSCF 106 in step S2. In step S3, the second CSCF 106 sends the INVITE message to the party being called 102.

In step S4, the party being called 102 sends a 200 OK message to the second CSCF 106. In step S5, the second CSCF 106 is arranged to send a 200 OK message to the first CSCF 104. In step S6, the second CSCF sets a timer. The second CSCF 106 is arranged to determine if a certain condition is satisfied within the time H set by the timer. In this embodiment, the condition is the receipt of an ACK message from the party being called.

The next step in a successful session set up should be the step S7 where a 200 OK message should be sent to the caller from the first CSCF 104. However, in this case, the 200 OK message from the first CSCF 104 and the caller 100 is lost. This signal may for example be lost on the on the air interface.

The party being called may resend the 200 OK as it will not receive an ACK message. Where no ACK message is received by the called party 102, the called party will generate a BYE request after time H expires. When either a non-ACK message is received by the second CSCF or time H has expired without an ACK message being received, the session is considered unsuccessful. Thus step S8 is waiting for an ACK signal from the calling party 100 within time H. Step S9 occurs if there has been no ACK message within time H. The second CSCF 106 marks the charging information with an indication that the session has been unsuccessful and sends this information to the charging node, for example CCF (charging collection function). The information may also include the reason why the session has been unsuccessful. It should be appreciated that in this embodiment of the present invention, the second CSCF is where the charging information is buffered before being passed to a charging node.

Figure 3:
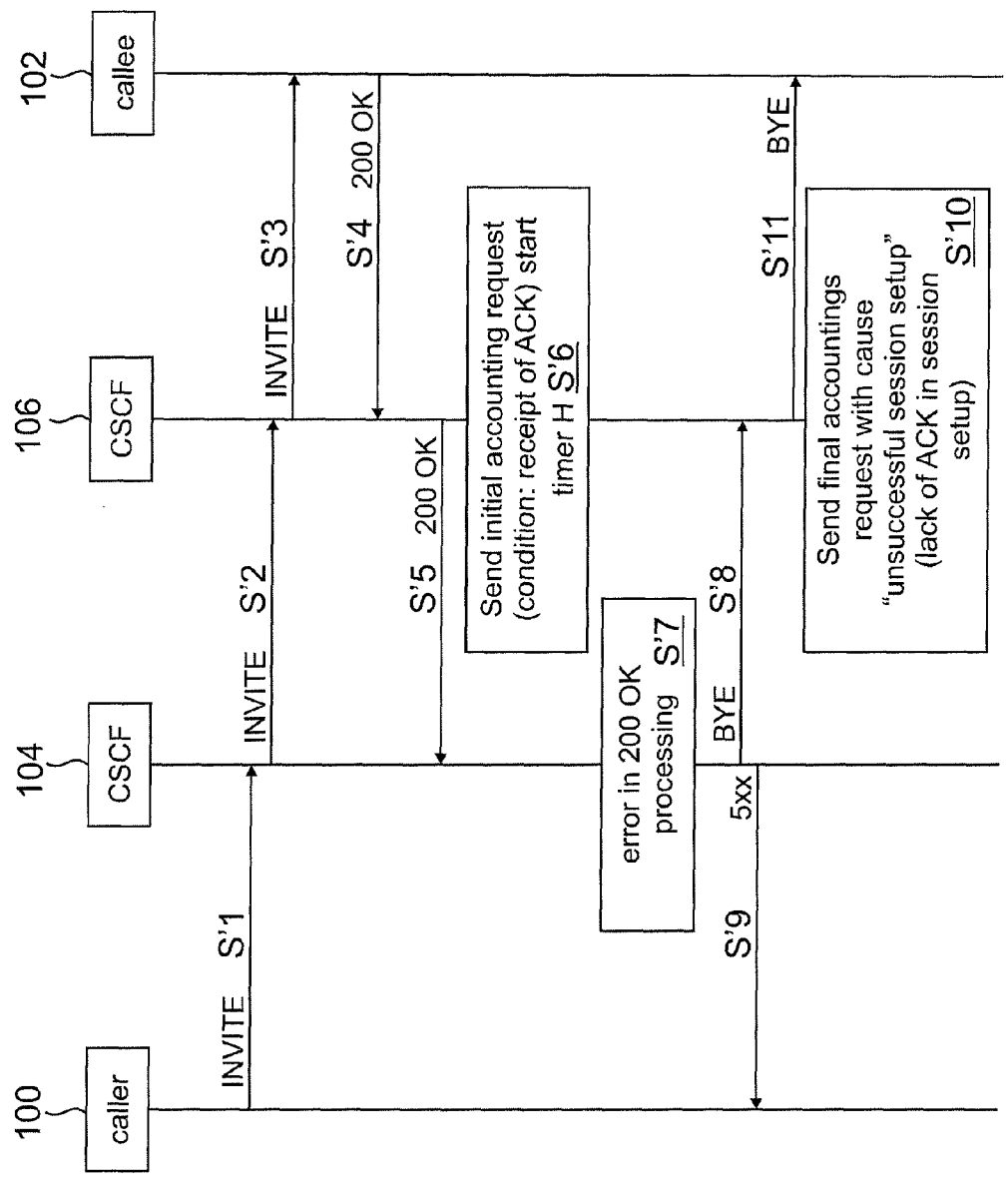
FIG. 3 shows a second signaling scenario between a calling party and a party being called.

Reference is made to FIG. 3, which shows a second signaling scenario between the calling party 100 and the called party. As with the previous example, the signaling between the calling party 100 and the called party 102 is shown as occurring via the first and second CSCFs 104 and 106 respectively. As with the previous Figure, there may be other entities between the called and calling parties, which have been omitted for clarity.

Steps S'1, S'2, S'3, S'4, S'5 and S'6 are the same as steps S1, S2, S3, S4, S5 and S6 respectively of FIG. 2 and will not be described again in detail.

The example of FIG. 3 shows the case when one of the CSCFs experiences an internal failure while processing the 200 OK message. In this example the error occurs in the first CSCF 104 in step S'7. When such an internal failure is experienced by the first CSCF, it may wait for a retransmission or it may decide to end the session set-up in the case of a severe or fatal error by sending a BYE request towards the callee. This involves sending a BYE request to the second CSCF 106 in step S'7. The first CSCF may also send a 5xx error response to the caller 100 in step S'9. The 5xx responses are failure responses given when a server itself has erred. This is defined in the IETF (internet engineering task force) specification RFC3261 specification which is hereby incorporated by reference. This solution helps the other CSCFs in the call path to mark the buffered charging information and to cancel the resources allocated to the session before timer H expires. In step S'10, the second CSCF 106 send to the charging node a final accounting request with an indication as to the cause of the session failure, that is the lack of the ACK message in the session set up. In step S'11, the second CSCF 106 is arranged to send a BYE request to the called party 102 which may be before or after step S'10.

If the first CSCF does not do anything, that is does not send the BYE request or the 5xx error response, and waits for a retransmission of the 200 OK message then the situation would be similar to that described in relation to FIG. 2.

In one embodiment of the invention, the value of time H is equal to 64T1 which is equal to 128 seconds in the current 3GPP standard.

The first CSCF may be a proxy-CSCF and the second CSCF may be a serving CSCF.

In the examples shown in FIGS. 2 and 3, it is assumed that the error is with the calling party or a CSCF with which the calling party communicates. It should be appreciated that embodiments of the invention can equally be used where there are problems with the called party user equipment or its serving CSCF or indeed with any element in the path between the calling and the called party.

Embodiments of the present invention thus may provide the following steps:
1. When the S-CSCF (that is the second CSCF 106) processes the 200 OK message corresponding to the INVITE message, it sends an initial accounting request to the CCF. This corresponds to steps S6 and S'6. The CCF opens the CDR (charging data record) conditionally, and the condition is the receipt of the ACK message from the calling party. The 200 OK message may not reach the calling user equipment for various reasons: P-CSCF (the next hop after the S-CSCF and corresponding to for example the first CSCF 104) may fail when processing the 200 OK; the user equipment may go out of coverage; etc.

2. If an ACK message is not received within time H (as defined in RFC3261), then the S-CSCF should consider the session set-up unsuccessful and sends a final accounting request to the CCF indicating unsuccessful session attempt (corresponding to step S9 of FIG. 2 and step S'10 of FIG. 3).
3. The CDR will be cancelled or marked indicating an unsuccessful session set-up. The exact behavior should be configurable in the CCF.
4. In the case where the processing of a 200 OK message fails in one of the CSCFs (e.g. because of an internal processing failure), then that CSCF should send a BYE request towards the user equipment which generated the 200 OK message, and a 5xx error response towards the user equipment waiting for the 200 OK. (This is described in relation to FIG. 3). This procedure will help the other proxies in the path of the session setup to quickly realize that the session setup has failed and thus send the final accounting request indicating unsuccessful session setup (if they have already sent the initial accounting request). This way the CSCFs do not need to wait for timer H to expire in order to cancel the CDRs.

Reference is made to TS 32.225 v5.0.0 3rd Generation Partnership Project; Technical Specification Group Service and System Aspects; Telecommunication management; Charging management; Charging data description for theIP Multimedia Subsystem (IMS) (Release 5) which is hereby incorporated by reference specifies a Diameter Accounting Request with the following ACR accounting request values: start, interim and stop. The offline charging functionality is based on the IMS network nodes reporting accounting information upon reception of various SIP methods or ISUP messages, as most of the accounting relevant information is contained in these messages. This reporting is achieved by sending Diameter Accounting Requests (ACR) [Start, Interim, Stop and Event] from the IMS nodes to the CCF (charge contol function. Thus, the Diameter client uses ACR Start, Interim and Stop in procedures related to successful SIP sessions. It uses ACR Events for unsuccessful SIP sessions and for session unrelated procedures. CDR (Charging Data Record) is the record generated by a network element for the purpose of billing a subscriber for the provided service. It includes fields identifying the user, the session and the network elements as well as information on the network resources and services used to support a subscriber session. The ACR values are not enough to cancel/mark the already started CDR. Accordingly, embodiments of the present invention provide a "Cause AVP" value or information to indicate why the final accounting request (ACR stop) has been sent from the IMS nodes to the CCF. One "cause AVP (attribute value pair)" is "unsuccessful session setup" as described above. Below is a table of current ACR values and the triggering SIP message. Embodiments of the present invention would provide a new Cause AVP value to indicate that session set up has failed.

| Diameter Message | Triggering SIP Method/ISUP Message | Mandatory/Configurable |
|---|---|---|
| ACR [Start] | SIP 200 OK acknowledging an initial SIP INVITE | Mandatory |
| | ISUP:ANM (applicable for the MGCF) | Mandatory |
| ACR [Interim] | SIP 200 OK acknowledging a SIP RE-INVITE [e.g. change in media components] | Configurable |

-continued

| Diameter Message | Triggering SIP Method/ISUP Message | Mandatory/Configurable |
|---|---|---|
| | Expiration of AVP [Acct-Interim-Interval] | Configurable |
| ACR [Stop] | SIP BYE message | Mandatory |
| | SIP Final Response with error codes 4xx, 5xx or 6xx, indicating termination of an ongoing session | Mandatory |
| | ISUP:REL (applicable for the MGCF) | Mandatory |
| ACR [Event] | SIP 200 OK acknowledging non-session related SIP messages, which are: | |
| | SIP NOTIFY | Configurable |
| | SIP MESSAGE | Configurable |
| | SIP REGISTER | Configurable |
| | SIP SUBSCRIBE | Configurable |
| | SIP Final Response (4xx, 5xx or 6xx), indicating an unsuccessful SIP session set-up | Configurable * |
| | SIP Final Response (4xx, 5xx or 6xx), indicating an unsuccessful session-unrelated procedure | Configurable * |
| | SIP CANCEL, indicating abortion of a SIP session set-up | Configurable * |
| | I-CSCF completing a Cx Query that was issued in response to a SIP INVITE | Configurable |

In preferred embodiments of the present invention, charging information which is initially set up because a 200 OK message is received at the serving CSCF should be cancelled/ignored or marked if there is an unsuccessful session set-up. In the latter case, the charging information could be used for statistical purposes, but not for charging.

This invention is also applicable to any other communication systems and protocols. Examples of other systems, without limiting to these, include the public internet and cable networks. Any other SIP method may also be used for communication. In embodiments of the invention, the confirming response has been in the form of a 200 OK message. However, it should be appreciated that other forms of confirmation message can be used in embodiments of the invention. For example, other 2xx responses may be used or indeed any other suitable form of message.

It should be appreciated that whilst embodiments of the present invention have been described in relation to user equipment such as mobile stations, embodiments of the present invention are applicable to any other suitable type of users. Various user equipment (UE) such as computers (fixed or portable), mobile telephones, personal data assistants or organizers and so on are known to the skilled person and can be used to access the internet to obtain services or to establish a session.

The invention claimed is:
1. A method comprising:
receiving, at a first entity, a response to a session initiated protocol invite confirming session set up, wherein said response confirming session set up comprises a 200 OK message;
determining after receiving said response if set up of said session has failed, wherein said determining comprises setting a time and determining that set up of said session has failed based on at least one of an acknowledgement from a calling party has not been received within said time and a failure of a second entity; and providing an indication to prevent at least one of the calling party and a called party from being charged for said session, if set up of said session is determined to have failed.

2. The method as claimed in claim 1, wherein said calling party and the called party are configured to operate in accordance with a session initiation protocol.

3. The method as claimed in claim 1, wherein said first entity is a call state control function of the called party.

4. The method as claimed in claim 1, wherein the first entity and the second entity are the same entity.

5. The method as claimed in claim 4, wherein the called party is connected to a serving call state control function.

6. The method as claimed in claim 1, comprising ending session set up if it is determined that said at least one entity has failed.

7. The method as claimed in claim 6, wherein said session set up is ended by a BYE message sent to another at least one entity.

8. The method as claimed in claim 6, wherein said session set up is ended by an error response sent to the calling party.

9. The method as claimed in claim 1, comprising ending session set up if it is determined that said session set up has failed.

10. The method as claimed in claim 9, wherein said session set up is ended by at least one BYE message.

11. The method as claimed in claim 1, comprising ending said session set up when said time has expired if an acknowledgment from the calling party has not been received or when a failure of said entity is determined.

12. The method as claimed in claim 1. wherein said determining is performed by at least one of said at least one entity.

13. The method as claimed in claim 1, wherein said preventing comprises sending a message to a charging entity.

14. The method as claimed in claim 13, wherein said message comprises information as to a cause of the failure of said session set up.

15. The method as claimed in claim 1, wherein said preventing causes charging information to be cancelled.

16. The method as claimed in claim 1, wherein said preventing causes charging information to be ignored for charging purposes.

17. The method as claimed in claim 1, wherein at least one entity is responsible for charging.

18. An apparatus comprising:
a receiver, at a first entity, configured to receive a response to a session initiated protocol invite confirming session set up. wherein said response confirming session set up comprises a 200 OK message; and
a processor configured to determine after receiving said response if set up of said session has failed, wherein said determining comprises setting a time and determining that set up of said session has failed based on at least one of an acknowledgement from a calling party has not been received within said time and a failure of a second entity, the processor further configured to provide an indication to prevent at least one of the calling party and a called party from being charged for said session if set up of said session between the calling party and the called party has failed, after said response confirming session set up has been received.

19. The apparatus as claimed in claim 18, wherein the response confirming session set up is received from said called party.

20. The apparatus as claimed in claim 18, comprising a transmitter configured to send a message to a charging entity to prevent at least one of the calling and called parties from being charged.

21. The apparatus as claimed in claim 20, wherein the message comprises an indication that session set up has failed.

22. The apparatus as claimed in claim 20, wherein the message comprises an indication as to a cause of session set up failure.

23. The apparatus as claimed in claim 18, wherein said apparatus is configured to uses session initiation protocol.

24. The apparatus as claimed in claim 18, wherein said apparatus comprises a call state control function.

25. A method comprising:
receiving, at an entity, an acknowledgement message, said acknowledgement message acknowledging an invite message for a session;
sending an initial accounting message corresponding to said session;
determining after receiving the acknowledgement message if set up of the session has failed, wherein said determining comprises setting a time and determining that set up of the session has failed based on at least one of the acknowledgement message from a calling party has not been received within said time and a failure of another entity; and
sending, if set up of the session has failed, a second accounting message indicating that at least one of a calling party and a called party is not to be charged for said session.

26. The method as claimed in claim 25 wherein the preventing comprises sending a further message, said further message indicating that at least one of said calling party and said called party is not to be charged for said session.

27. The method as claimed in claim 26, wherein said sending a further message comprises sending a message to a charging entity.

28. The method of claim 25 wherein the determining if set up of said session has failed comprises determining if an acknowledgement message has been received within a predetermined time.

29. The method of claim 25 wherein the determining if set up of said session has failed comprises receiving a message indicating that session setup has failed.

30. An apparatus comprising:
a receiver configured to receive an acknowledgement message, said acknowledgement message acknowledging an invite message for a session;
a transmitter configured to send first accounting message corresponding to said session; and
a processor configured to determine after receiving the acknowledgement message if set up of the session has failed by setting a time and determining that set up of the session has failed based on at least one of the acknowledgement message from a calling party has not been received within said time and a failure of another entity, wherein, if said processor determines that set up of the session has failed, said transmitter is configured to send a second accounting message indicating that at least one of at least one of a calling party and a called party is not to be charged for said session.

31. An apparatus as claimed in claim 30, wherein said apparatus comprises a call state control function.

32. The apparatus as claimed in claim 30 comprising a transmitter configured to sending a further message, said further message indicating that at least one of said calling party and said called party is not to be charged for said session.

33. The apparatus as claimed in claim 32, wherein said transmitter is configured to send a message to a charging entity.

34. The apparatus as claimed in claim 30 wherein the processor is configured determine that set up of said session has failed based on whether said receiver receives an acknowledgement message within a predetermined time.

35. The apparatus as claimed in claim 30 wherein the processor is configured to determine that set up of said session has failed based on whether said receiver receives a message indicating that session setup has failed.

36. An apparatus comprising:
means for receiving a response to a session initiated protocol invite confirming session set up, wherein said response confirming session set up comprises a 200 OK message;
means for determining after receiving said response if set up of said session has failed. wherein said determining comprises setting a time and determining that set up of said session has failed based on at least one of an acknowledgement from a calling party has not been received within said time and a failure of a second entity; and
means for providing an indication to prevent at least one of the calling party and a called party from being charged for a session if an attempt to set up a session between the calling party and the called party has failed, after said response confirming session set up has been received.

\* \* \* \* \*

UNITED STATES PATENT AND TRADEMARK OFFICE
CERTIFICATE OF CORRECTION

PATENT NO. : 7,831,247 B2
APPLICATION NO. : 10/291760
DATED : November 9, 2010
INVENTOR(S) : Jaro Gabor et al.

It is certified that error appears in the above-identified patent and that said Letters Patent is hereby corrected as shown below:

In the Claims

Column 10, Line 51, should read

30. An apparatus comprising:

a receiver configured to receive an acknowledgement message, said acknowledgement message acknowledging an invite message for a session;

a transmitter configured to send first accounting message corresponding to said session; and a processor configured to determine after receiving the acknowledgement message if set up of the session has failed by setting a time and determining that set up of the session has failed based on at least one of the acknowledgement message from a calling party has not been received within said time and a failure of another entity, wherein, if said processor determines that set up of the session has failed, said transmitter is configured to send a second accounting message indicating that at least one of ~~at least one of~~ a calling party and a called party is not to be charged for said session.

Signed and Sealed this
Seventh Day of October, 2014

Michelle K. Lee
*Deputy Director of the United States Patent and Trademark Office*